(12) United States Patent
Di Meco et al.

(10) Patent No.: US 7,985,152 B2
(45) Date of Patent: Jul. 26, 2011

(54) TOOTHED BELT

(75) Inventors: Marco Di Meco, Pescara (IT);
Tommaso Di Giacomo, S. Martino Sulla Marrucina (IT)

(73) Assignee: Dayco Europe S.R.L. (IT)

( * ) Notice: Subject to any disclaimer, the term of this patent is extended or adjusted under 35 U.S.C. 154(b) by 187 days.

(21) Appl. No.: 10/595,406

(22) PCT Filed: Oct. 15, 2004

(86) PCT No.: PCT/EP2004/052559
§ 371 (c)(1),
(2), (4) Date: Oct. 23, 2006

(87) PCT Pub. No.: WO2005/038294
PCT Pub. Date: Apr. 28, 2005

(65) Prior Publication Data
US 2007/0135251 A1    Jun. 14, 2007

(30) Foreign Application Priority Data

Oct. 17, 2003  (IT) .............................. TO2003A0821

(51) Int. Cl.
*B29D 29/08* (2006.01)
*F16G 1/28* (2006.01)
(52) U.S. Cl. ......... 474/205; 474/268; 474/271; 156/140
(58) Field of Classification Search ................... 474/205, 474/237, 260, 202, 266, 268, 271; 264/227; 428/172; 427/407.1, 412.1–412.5; 156/137–141
See application file for complete search history.

(56) References Cited

U.S. PATENT DOCUMENTS

| | | | |
|---|---|---|---|
| 3,600,309 A | 8/1971 | Loser et al. | |
| 4,196,249 A | 4/1980 | Patrichi | |
| 5,171,190 A * | 12/1992 | Fujiwara et al. | 474/267 |
| 5,238,991 A | 8/1993 | Magnus et al. | |
| 5,860,883 A * | 1/1999 | Jonen et al. | 474/205 |
| 5,861,212 A * | 1/1999 | Mori et al. | 428/375 |
| 6,013,218 A | 1/2000 | Patitsas et al. | |
| 6,153,686 A | 11/2000 | Granatowicz et al. | |
| 6,352,488 B1 | 3/2002 | Morris et al. | |
| 2002/0015825 A1 * | 2/2002 | Meco et al. | 428/172 |
| 2004/0014544 A1 * | 1/2004 | Ito et al. | 474/251 |
| 2006/0174997 A1 * | 8/2006 | Gibson et al. | 156/139 |

FOREIGN PATENT DOCUMENTS

| | | |
|---|---|---|
| EP | 0711643 A | 5/1996 |
| EP | 1052425 A | 11/2000 |
| EP | 1157813 A | 11/2001 |
| EP | 1396658 A | 3/2004 |
| WO | 00/63580 A | 10/2000 |
| WO | 01/75330 A | 10/2001 |

* cited by examiner

*Primary Examiner* — Robert Siconolfi
*Assistant Examiner* — Anna Momper
(74) *Attorney, Agent, or Firm* — Marger Johnson & McCollom, P.C.

(57) ABSTRACT

Described herein is a toothed belt comprising a body made of elastomeric material, in which there is embedded a plurality of longitudinal filiform resistant inserts or cords, and a toothing coated with a coating fabric; on top of the coating fabric there is made to adhere a resistant layer, which increases resistance to wear of the toothed belt and comprises a fluorine-based plastomer with addition of elastomeric material, in which the plastomer is present in a larger amount than is the elastomeric material and in which the majority of the particles constituting the fluorine-based plastomer have a size less than 10 μm. The resistant layer is applied directly on the fabric via spreading. The fluorinated plastomer preferably has a base of polytetrafluoroethylene compound.

7 Claims, 1 Drawing Sheet

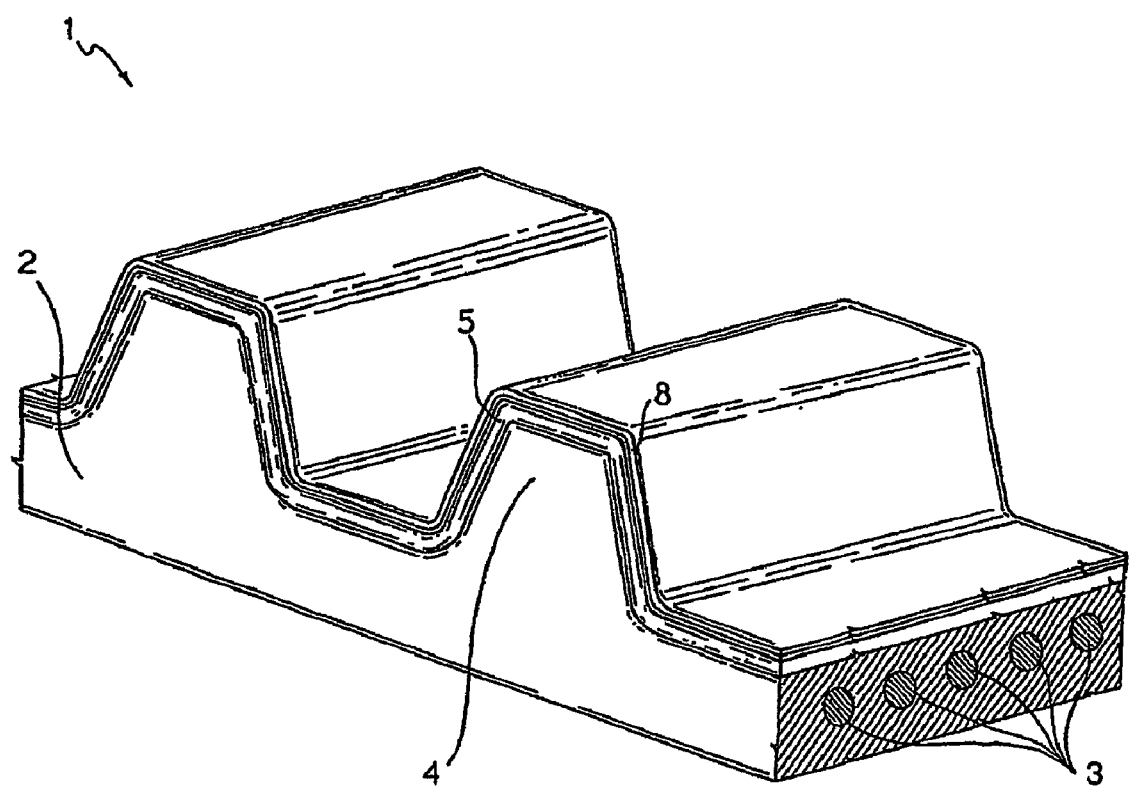

TOOTHED BELT

RELATED APPLICATION DATA

This application claims priority and benefit of PCT/EP2004/052559, filed 15 Oct. 2004, which claims priority from Italian application no. TO2003A 000821, filed 17 Oct. 2003, the entire contents of which are hereby incorporated by reference.

TECHNICAL FIELD

The present invention relates to a toothed belt and, in particular, to a coating layer for a fabric for toothed belts.

BACKGROUND ART

A toothed belt is known comprising a body made of elastomeric material, embedded in which is a plurality of longitudinal filiform resistant inserts, also referred to as "cords", and a plurality of teeth coated with a coating fabric.

Each component of the belt contributes to increasing the performance in terms of mechanical resistance so as to decrease the risk of failure of the belt and increase the specific transmissible power.

The coating fabric of the belts increases the resistance to abrasion and hence protects the working surface of the belt from wear due to rubbing between the sides and the slanting surfaces of the teeth of the belt and the sides and the bottom lands of the races of the pulley with which the belt interacts.

Furthermore, the coating fabric reduces the coefficient of friction on the working surface and reduces the deformability of the teeth, thus preventing failure.

The coating fabric used may be constituted by a single layer or, alternatively, may be double-layered so as to guarantee greater sturdiness and stiffness.

The fabric is normally treated with an adhesive, for example resorcinol and formaldehyde lattice (RFL) to increase adherence between the body and the fabric itself.

There are moreover employed a number of methods for increasing resistance to wear of drive belts by modifying the structure of the coating fabric or performing different treatments on the fabric, for example, treatments of the fabric with halogenated polymers.

Said treatments do not, however, lead to any great increase in resistance to wear in so far as the coating fabric of the toothed belt, in use, constitutes in any case the working surface.

To overcome the above problem, the patent EP1157813 filed in the name of the present applicant proposed coating the coating fabric with a resistant layer comprising a fluorinated plastomer, an elastomeric material, and a vulcanizing agent. The fluorinated plastomer is present in the resistant layer in an amount greater than that of the elastomeric material.

The use of said resistant layer has enabled excellent results in terms of increase in resistance to wear to be obtained.

The resistant layer is formed via the use of a fluorinated plastomer comprising particles which have an average size of 20 μm or more and are in the form of agglomerates. Consequently, said agglomerates have sizes such as to entail a difficult mixability in solution with the elastomer. The agglomerates are hence also present in the final resistant layer that is consequently non-homogeneous, and said lack of homogeneity can generate a high level of noise.

Research has hence been carried out into solutions that will enable, together with a high resistance to wear, also an improved and lower level of noise during operation of the toothed belt to be achieved.

DISCLOSURE OF INVENTION

The purpose of the present invention is hence to provide a toothed belt which will present a high resistance to wear and, at the same time, will enable a low noise level during operation at both high and low running rates to be obtained.

According to the present invention, the above purpose is achieved with a toothed belt according to claim 1.

According to the present invention, there is moreover provided a process according to claim 7.

BRIEF DESCRIPTION OF THE DRAWING

For a better understanding of the present invention, a description thereof is provided in what follows also with reference to the attached FIGURE, which is a partial perspective view of a toothed belt according to the present invention.

BEST MODE FOR CARRYING OUT THE INVENTION

In the FIGURE, designated as a whole by 1 is a toothed belt. The belt 1 comprises a body 2 made of elastomeric material, embedded in which is a plurality of longitudinal filiform resistant inserts or cords 3.

The body 2 has a toothing 4, which is coated with a coating fabric 5.

The body 2 comprises a mix made of elastomeric material possibly reinforced with fibre and comprising a main elastomer preferably chosen in the group consisting of acrylonitrile/butadiene, hydrogenated acrylonitrile/butadiene, polyethylene chlorosulphonate, EPDM, and chloroprene.

Even more preferably, the main elastomer is hydrogenated acrylonitrile/butadiene.

The mix made of elastomeric material may contain, in addition to the main elastomer, also other elastomers and, moreover, conventional additives, for example reinforcing agents, fillers, pigments, stearic acid, accelerators, vulcanizing agents, antioxidants, activators, initiators, plastifiers, waxes, pre-vulcanizing inhibitors, and the like. For example, as filler there can be employed carbon black or white filler, which is generally added in amounts comprised between 5 and 200 phr, preferably approximately 70 phr. There can also be added talcum powder, calcium carbonate, silica, and the like, in amounts generally comprised between 5 and 150 phr, or dispersions in oil containing fillers. There may be used organosilanes in amounts comprised between 0.1 and 20 phr. There can be used as vulcanizing agents sulphur donors, for example, amino disulphides and polymeric polysulphides, or free sulphur, or organic and inorganic peroxides. The amount added varies according to the type of rubber and the type of vulcanizing agent employed and is generally comprised between 0.1 and 10 phr. Amongst the antidegradants most widely used in the composition of the mix there are microcrystalline waxes, paraffin waxes, monophenols, bisphenols, thiophenols, polyphenols, derivatives of hydroquinone, phosphites, mixtures of phosphates, thioesters, naphthyl amines, diphenol amines, substituted and non-substituted derivatives of diaryl amines, diaryl phenylene diamines, paraphenylene diamines, quinolines, and mixtures of amines. The antidegradants are generally employed in amounts comprised between 0.1 and 10 phr. Examples representing process oils that can be used are dithiobisbenzanylide, polyparadinitrosobenzene, xylyl mercaptans, polyethylene glycol, paraffin oils, vulcanized vegetable oils, phenolic resins, synthetic oils, paraffin resins, and polymeric esters. Process oils can be used in conventional amounts of between 0 and 140 phr. Amongst the initiators, there is conventionally used stearic acid in an amount comprised between 1 and 4 phr. There can moreover be added conventional additives, such as calcium oxide, zinc oxide and magnesium oxide, generally in amounts comprised between 0.1 and 25 phr. There are also employed conventional accelerating agents or combinations of accelerating agents, such as amines, disulphides, guanidine, thiourea, thiazoles, thiols, sulphenamides, dithiocarbamates, and xanthates generally in amounts comprised between 0.1 and 100 phr.

The resistant inserts or cords 3 are, for example, made of highly resistant glass fibres, but can also be aramidic fibres or fibres with high modulus, for example PBO.

The coating fabric 5 of the toothed belt 1 may be formed by one or more layers and may for example be obtained by means of the textile techniques known as 2×2 twill.

Alternatively, the coating fabric 5 may be obtained according to textile techniques that will enable at least one rough surface to be obtained for improving mechanical adhesion.

The fabric 5 is preferably constituted by a polymeric material, preferably aliphatic or aromatic polyamide, even more preferably, 6/6 polyamide with high thermal resistance and high toughness.

The fabric 5 can also be of the type in which each weft thread is constituted by an elastic thread as core and by at least one composite thread wound on the elastic thread, where the composite thread comprises a thread with high thermal and mechanical resistance and at least one coating thread wound on the thread with high thermal and mechanical resistance.

A toothed belt 1 according to the present invention further comprises a resistant layer 8 arranged on the outside of the fabric 5. The resistant layer 8 is constituted by a fluorinated plastomer with the addition of an elastomeric material, and the fluorinated plastomer is present in an amount by weight greater than that of the elastomeric material.

According to the present invention, the fluorinated plastomer is formed prevalently, i.e., for more than 50%, by particles having average dimensions smaller than 10 µm, preferably having a size of between 5 and 9 µm.

Said particles, in contrast to the known art, do not form agglomerates of dimensions equal to the known ones, but rather have much smaller dimensions, for example 6 µm.

Preferably, the fluorinated plastomer is a polytetrafluoroethylene-based compound; for example DYNEON TF9201 may be used.

Preferably, the elastomeric material with which the fluorinated plastomer is mixed to form the resistant layer 8 is HNBR; even more preferably, it is an HNBR modified with a zinc salt of polymethacrylic acid, for example ZEOFORTE ZSC (Nippon Zeon, registered trademark) may be used.

Furthermore, preferably, the coating fabric 5 is in direct contact with the resistant layer 8, and hence no adhesive material is set between them.

According to the known art described in the patent EP1157813, set between the fabric and the resistant layer is an adhesive material for improving adhesion of the resistant layer 8 on the fabric 5.

Unlike what occurs according to the known art, in the present invention, the resistant layer 8 is made to adhere directly to the fabric 5.

Preferably, in order to ensure the necessary resistance, the resistant layer 8 has a weight of between 50 and 80 g/m$^2$, which is equivalent to an average thickness of between 30 and 50 µm.

Preferably, the fluorinated plastomer is present in an amount comprised between 101 and 150 by weight per 100 parts of elastomeric material.

The resistant layer 8 further comprises a peroxide as vulcanizing agent. The peroxide is added normally in an amount comprised between 1 and 15 parts by weight per 100 parts of elastomeric material.

The resistant layer 8 is applied directly on the fabric 5, preferably via spreading on the fabric 5 itself.

Next, the toothed belt 1 is vulcanized according to commonly applied and known methods, which consequently do not call for any detailed description herein.

From an examination of the characteristics of the toothed belt made according to the present invention, the advantages that it enables are evident.

In particular, it has surprisingly been found that, when a coating fabric 5 of a toothed belt is coated with a resistant layer 8 of the same type as the one previously described, the resistance to wear of the toothed belt is excellent, and, at the same time, during operation, the toothed belt has a low noise level at both high and low rates of operation.

In addition, the new formulation of the fluorinated plastomer presents an excellent resistance to the abrasion typical of fluorinated-based additives, together with excellent mechanical characteristics of the elastomeric materials, and is able to adhere to the fabric 5 without the use of any adhesive.

The fact that the use of adhesives is avoided also enables advantageously elimination of a step during the process of fabrication of the belt 1, thus achieving considerable savings in terms of times and costs.

Furthermore, thanks to the improved properties of the resistant layer 8 according to the present invention and, in particular, of the fluorinated plastomer, a smaller amount of costly fluorinated material is used, and a thinner resistant layer 8 is applied, albeit maintaining intact the mechanical characteristics and the characteristics of resistance to wear.

Finally, the application via spreading further enables a resistant layer 8 of uniform thickness to be easily obtained.

The toothed belt according to the present invention will now be described also by means examples, which are not, however, to be understood as in any way limiting the scope of the invention.

EXAMPLE 1

Appearing in Table 1 are the characteristics of a fluorinated plastomer that can be used in a resistant layer 8 according to the present invention.

TABLE 1

| DYNEON TF9201 | |
| --- | --- |
| Mean density ASTM D 1457 | |
| Melting temperature ASTM D 1457 | |
| Size distribution of the particles (Microtac Laser) | On average 6 µm |
| Specific surface area (Absorption of nitrogen) | 11 |

EXAMPLE 2

Appearing in Table 2 are the characteristics of an elastomeric material in a resistant layer 8 according to the present invention.

TABLE 2

| ZETPOL 2010 | |
| --- | --- |
| Bound acrylonitrile wt % | 36 |
| Mooney viscosity MS 1 + 4 ml 100° C. | 85 |
| Specific gravity | 0.98 (g/cm$^3$) |

EXAMPLE 3

Appearing in Table 3 is the chemical composition of a resistant layer 8 made according to the present invention. Said resistant layer has a thickness of 0.037 mm.

TABLE 3

| Elastomeric material as per Example 2 | 100 phr |
| --- | --- |
| Fluoropolymer-based additive as per Example 1 | 125 phr |
| Peroxide | 6 phr |

The invention claimed is:

1. A process for fabrication of a toothed belt, comprising:
   forming an elongate belt body of a first elastomeric material, the belt having a first, planar side and a second side opposite the first side;
   forming teeth along the second side;
   coating the teeth with a fabric of a polymeric material;
   treating the fabric with a liquid solution of RFL to impregnate fibres of the fabric;
   coating the treated fabric with a resistant layer comprising a fluorinated plastomer and a second elastomeric material, the fluorinated plastomer being present in the resistant layer in an amount between 101 and 150 parts by weight of an amount of the elastomeric material and containing more than 50% of particles of a size smaller than 10 μm; and
   directly adhering the resistant layer to the fabric coated over the teeth, wherein the resistant layer is applied directly to the fabric via spreading a weight of the fluorinated plastomer and second elastomeric material between 50 and 80 g/m$^2$ to produce a uniform thickness resistant layer on the treated fabric.

2. A process according to claim 1 in which forming the elongate belt body includes embedding a plurality of longitudinal filiform resistant inserts or cords in the first elastomeric material.

3. A process according to claim 1, characterized in that said second elastomeric material comprises HNBR.

4. A process according to claim 1, characterized in that said fluorinated plastomer is polytetrafluoroethylene.

5. A process according to claim 4, characterized in that said second elastomeric material comprises HNBR.

6. A process according to claim 5, characterized in that said second elastomeric material comprises HNBR modified with a zinc salt of polymethacrylic acid.

7. A process according to claim 1, characterized in that the resistant layer thickness is from 30 and 50 micrometers.

* * * * *